United States Patent

Ohzora et al.

[11] Patent Number: 5,940,865
[45] Date of Patent: Aug. 17, 1999

[54] APPARATUS AND METHOD FOR ACCESSING PLURAL STORAGE DEVICES IN PREDETERMINED ORDER BY SLOT ALLOCATION

[75] Inventors: Mayumi Ohzora; Takahiro Aoki, both of Kawasaki, Japan

[73] Assignee: Fujitsu Limited, Kawasaki, Japan

[21] Appl. No.: 08/828,563

[22] Filed: Mar. 31, 1997

[30] Foreign Application Priority Data

Oct. 14, 1996 [JP] Japan ................................. 8-270589

[51] Int. Cl.[6] ........................................................ G06F 12/00
[52] U.S. Cl. ........................ 711/167; 711/112; 711/168; 711/151; 711/150; 395/865; 395/856; 395/860
[58] Field of Search ................................. 711/167, 150, 711/151, 114, 168, 112; 395/200.08, 865, 856, 860

[56] References Cited

U.S. PATENT DOCUMENTS

| | | | |
|---|---|---|---|
| 4,855,996 | 8/1989 | Douskalis | 370/84 |
| 5,351,246 | 9/1994 | Blaum et al. | 371/10.1 |
| 5,612,790 | 3/1997 | Sakamoto et al. | 386/69 |
| 5,752,256 | 5/1998 | Fujii et al. | 711/114 |
| 5,764,893 | 6/1998 | Okamoto et al. | 392/200.8 |

*Primary Examiner*—Eddie P. Chan
*Assistant Examiner*—Kimberly N. McLeon
*Attorney, Agent, or Firm*—Staas & Halsey LLP

[57] ABSTRACT

A data input/output control apparatus and a storage device accessing method are provided wherein multiple information is simultaneously supplied to multiple users. Multiple information to be supplied to users is stored distributedly in a plurality of storage devices. A slot allocating unit determines the number S of slots such that the value S is prime to the number D of storage devices, and groups time zones in which data is read from or written into the storage devices to S slots in access order. On receiving an access demand from a user, the slot allocating unit allocates slots to the user. When writing data into a specific storage device, an access control unit writes data into the specific storage device by using a specific slot for accessing the specific storage device, from among the slots allocated to the user, and a slot which is D−1 slots before the specific slot. Consequently, a plurality of groups (dependence rings) of mutually dependent slots are formed.

8 Claims, 14 Drawing Sheets

| NO. OF STORAGE DEVICES: D | MAX. NO. OF SLOTS: S | NO. OF DEPENDENCE RINGS: D-1 | NO. OF SLOTS IN DEPENDENCE RING: n |
|---|---|---|---|
| 2 | 3 | 1 | 3 |
| 2 | 5 | 1 | 5 |
| 2 | 7 | 1 | 7 |
| 2 | 9 | 1 | 9 |
| 2 | 11 | 1 | 11 |
| 2 | 13 | 1 | 13 |
| 2 | 15 | 1 | 15 |
| 2 | 17 | 1 | 17 |
| 2 | 19 | 1 | 19 |
| 3 | 4 | 2 | 2 |
| 3 | 8 | 2 | 4 |
| 3 | 10 | 2 | 5 |
| 3 | 14 | 2 | 7 |
| 3 | 16 | 2 | 8 |
| 4 | 9 | 3 | 3 |
| 4 | 15 | 3 | 5 |
| 5 | 8 | 4 | 2 |
| 5 | 12 | 4 | 3 |
| 5 | 16 | 4 | 4 |
| 7 | 12 | 6 | 2 |
| 7 | 18 | 6 | 3 |
| 9 | 16 | 8 | 2 |

FIG. 7

| USER NO. | READ/WRITE RESTRICTION |
|---|---|
| 0 0 1 | READ ONLY |
| 0 0 2 | READ ONLY |
| 0 0 3 | NO RESTRICTION |
| ⋮ | ⋮ |

FIG. 8

| SLOT NO. | USER NO. | READ/WRITE FLAG |
|---|---|---|
| 0 | 0 0 1 | R |
| 1 | VACANT | R |
| 2 | VACANT | R/W |
| 3 | VACANT | R |
| 4 | 0 0 2 | R |
| 5 | VACANT | R |
| 6 | 0 0 3 | R/W |
| 7 | VACANT | R |

FIG. 9

READ TIMING
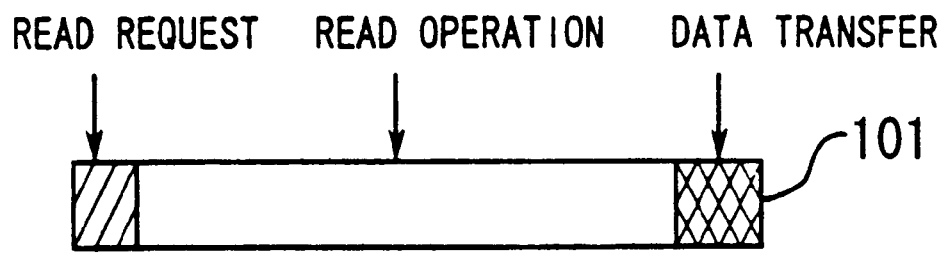
WRITE TIMING
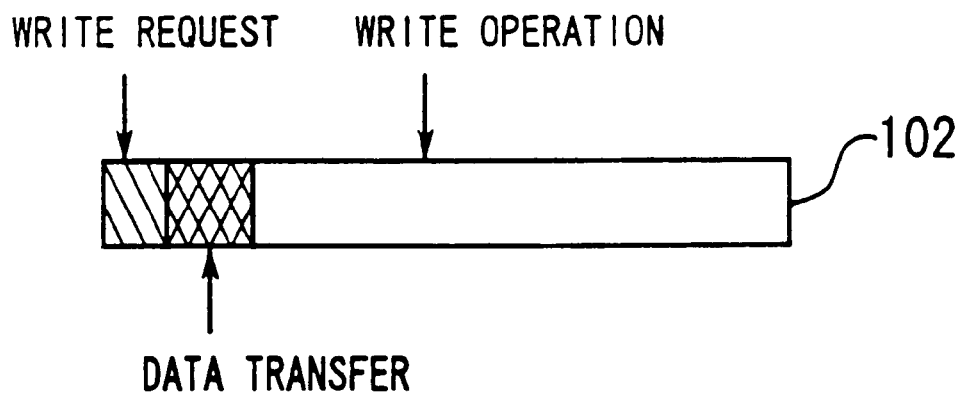
FIG. 11
PRIOR ART

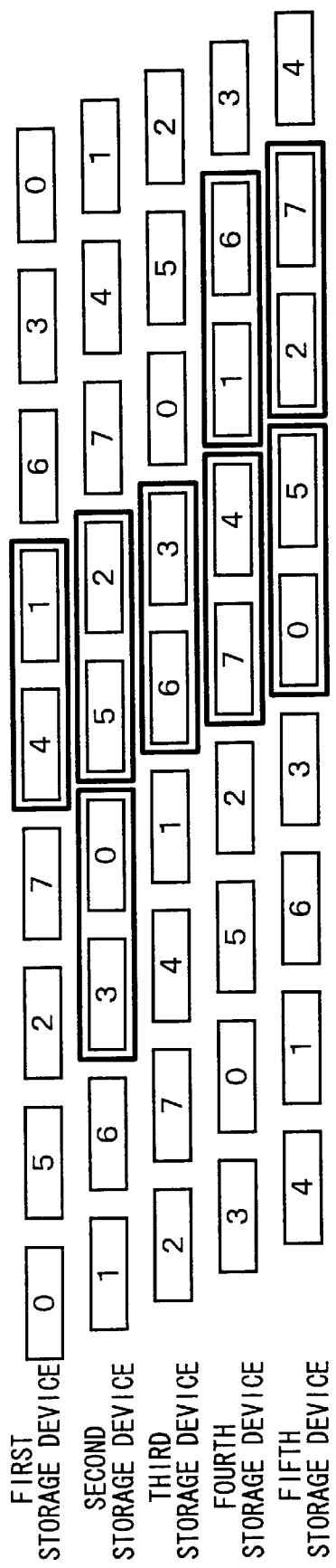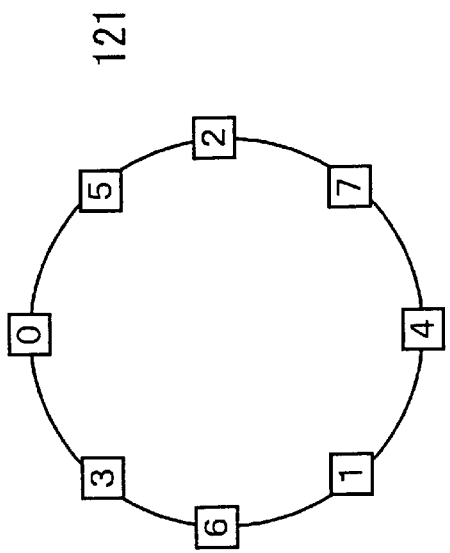
PRIOR ART
FIG. 14

APPARATUS AND METHOD FOR ACCESSING PLURAL STORAGE DEVICES IN PREDETERMINED ORDER BY SLOT ALLOCATION

BACKGROUND OF THE INVENTION (1) Field of the Invention

The present invention relates to a data input/output control apparatus for controlling the input/output of data to simultaneously provide a plurality of users with multiple information and a method of accessing storage devices. More particularly, the present invention relates to a data input/output control apparatus, in which multiple information to be supplied to users is stored in a distributed fashion in a plurality of storage devices, and to an access method for accessing storage devices storing multiple information in a distributed manner.

(2) Description of the Related Art

In the recent multimedia market, text data, sound data and still image data are extensively communicated in two ways such as via personal computer communications and the Internet. For the future, there is a strong demand for exchange of even larger amounts of data such as dynamic picture images. Once the exchange of dynamic picture images becomes available, then such could presumably be applied to a variety of fields such as VOD (Video-On-Demand), telemarketing, telecommunication "karaoke" service, and role-playing games. In the case of providing users with dynamic picture images in such fields of application, dynamic picture data collected at one location (e.g., a video server in the VOD application) is transmitted to a plurality of users. Therefore, it is necessary that the server side, from which dynamic picture data is transmitted, should read dynamic picture data efficiently from storage devices.

Conventionally, a data access technique called striping is used to enhance the storage-accessing efficiency. According to this technique, a plurality of magnetic disk drives are connected to a data input/output control apparatus via one bus. A sequence of data (e.g., dynamic picture data) to be supplied to users is divided into a plurality of unit data of a predetermined length. These units of data are stored in a distributed fashion the multiple magnetic disk drives in predetermined order. The data input/output control apparatus accesses the multiple magnetic disk drives in the predetermined order.

An access demand from a user is complied with in the order of data storage in the storage devices. Consequently, the user can acquire a sequence of data in the predetermined order and can refer to the contents of sequential data such as dynamic picture data.

In order for a user to be supplied with information stored in the storage devices, it is necessary that an access time slot be allocated to the user. In the following description, the access time slot is merely referred to as a "slot." The slot is a time zone equivalent to one cycle during which the individual storage devices read or write data. A fixed number is predefined for the slots, and the slots are assigned respective slot numbers in order of operations to be performed with respect to the time zones during which the storage devices perform data read operations etc. If the predefined number of slots is 8, then the slot numbers allocated are 0 through 7. Namely, the time zones during which the multiple storage devices read or write data are grouped according to the slot numbers in order of access. The user who has been allocated a slot number from the server can access the storage devices by means of the slots with the allocated slot number.

To permit each slot number to be distributed to all storage devices, the number of slots and the number of storage devices must be prime with respect to each other. This is because, if the number of slots and the number of storage devices have a common divisor other than 1, slots with the same slot number are confined to a certain storage device, thus making it impossible to access the other storage devices. Consider the case where the number of storage devices and the number of slots are respectively 5 and 10 ("5" also is a common divisor), for example. If a slot with the slot number "0" is associated with a first storage device, then the slot number "0" is given next time to the same first storage device. Thus, the user who uses slots with the slot number "0" cannot acquire information stored distributedly in all storage devices. That is, only in the case where the number of slots and the number of storage devices are prime with respect to each other, the user can acquire a sequence of information from all storage devices in the predetermined order.

Also, since the data input/output control apparatus and the multiple storage devices are connected via one bus, data transfer between the data input/output control apparatus and the storage devices must be carried out by dividing time for the respective storage devices. If all the processes to be performed are data read operations, then the time of occupation of the bus can be allocated equally to the individual storage devices. However, since the bus occupation timing differs between a read operation and a write operation, if the process to be performed includes both read and write operations, they cannot be carried out in accordance with the same timing.

FIG. 11 is a diagram illustrating the read and write timings of a storage device. In a read slot 101, a read request is first received via the bus. In accordance with the read request, the storage device reads out data, and then transfers the read data via the bus. In a write slot 102, on the other hand, a write request is first received via the bus, then data to be written is received via the bus, and the data is written.

Thus, in the read slot, the data transfer is started upon lapse of a predetermined time after the reception of the read request, while in the write slot, the data transfer is carried out immediately after the write request is received. This difference of data transfer timing affects the efficiency of data transfer on the bus when a write request has occurred.

The following explains an access status wherein all the processes to be performed are data read operations, and an access status wherein the processes to be performed include both write and read operations. In the following, it is assumed that the number of storage devices and the number of slots are respectively 5 and 8, by way of example.

FIG. 12 is a diagram showing an access status wherein all the slots are used for read operations. In FIG. 12, the access status is indicated by the array of slots. FIG. 12 shows, from the top downward, the access status of a first disk drive, the access status of a second disk drive, the access status of a third disk drive, the access status of a fourth disk drive, the access status of a fifth disk drive, and data on the bus. The horizontal axis in FIG. 12 indicates time elapsed.

As illustrated, the times at which the disk drives start read operations in their respective slots are slightly shifted from one another. Thereby the read request and the transfer data are alternately transmitted through the bus, making it possible to fetch data sequentially from the disk drives.

If two slots 111 and 112 in FIG. 12 are used for write operations, a time period for transferring data to be written must be reserved immediately following each write request.

Therefore, the operations of the same disk drives in the slots 113 and 114 immediately preceding the slots 111 and 112, respectively, are canceled.

FIG. 13 is a diagram showing an access status wherein both write and read operations are performed. As illustrated in FIG. 13, slots 111a and 112a for write operation use time zones 111b and 112b, respectively, which correspond to the data transfer time zones of the slots 113 and 114 in FIG. 12, to transfer data. Thus, a write operation is executed by canceling the read operations in other slots.

According to the conventional technique, however, there is a possibility that every slot will be affected by the write operations in other slots. Therefore, a problem arises in that even a slot which is transferring data of great importance can unavoidably be adversely affected by the write operations in other slots transferring less important data.

FIG. 14 is a diagram showing the dependence of the individual slots according to the conventional access technique. FIG. 14 illustrates the case where the number of disk drives and the number of slots are 5 and 8, respectively. In FIG. 14, the numerals inside the rectangular slot time zones represent the slot numbers of the respective slots, and mutually dependent slots are enclosed by a thick line.

As seen from FIG. 14, the slot "0" affects the slot "3", the slot "1" affects the slot "4", the slot "2" affects the slot "5", the slot "3" affects the slot "6", the slot "4" affects the slot "7", the slot "5" affects the slot "0", the slot "6" affects the slot "1", and the slot "7" affects the slot "2". Owing to this dependence relationship, all slots are influenced by one another. The dependence relationship can be expressed in the form of a ring, which is hereinafter referred to as a "dependence ring."

In the example shown in FIG. 14, the slots form a dependence ring 121 of which the direction of dependence is counterclockwise, that is, "0-3-6-1-4-7-2-5-(0)". If a write operation is performed in a slot, the slot adjacent thereto in the counterclockwise direction of the dependence ring 121 is affected. Accordingly, the influence of one slot upon another is unavoidable, and moreover, it is impossible to specify which slot is more likely to be adversely affected.

SUMMARY OF THE INVENTION

An object of the present invention is to provide a data input/output control apparatus capable of eliminating the dependence among slots used for different purposes.

Another object of the present invention is to provide a storage device accessing method capable of eliminating the dependence among slots used for different purposes.

To achieve the first object, there is provided a data input/output control apparatus which includes a plurality of storage devices storing multiple information in a distributed manner and accessed in predetermined access order. This data input/output control apparatus comprises slot allocating means for determining a number S of slots such that the number S is prime to a number D of the storage devices, grouping time zones in which data is read from or written into the storage devices to S slots in the access order, and allocating slots to a user who output a demand for access to the storage devices, and access control means for reading data from the storage devices by using the slots allocated to the user when reading data to be supplied to the user, and writing data into a specific storage device by using a specific slot for accessing the specific storage device from among the slots allocated to the user and a slot which is D-1 slots before the specific slot when writing data into the specific storage device in compliance with the user demand.

To achieve the second object, there is provided a method of accessing a plurality of storage devices storing multiple information in a distributed manner and accessed in predetermined access order. The storage device accessing method comprises the steps of determining a number S of slots such that the number S is prime to a number D of the storage devices and grouping time zones in which data is read from or written into the storage devices to S slots in the access order, allocating slots to a user who output a demand for access to the storage devices, reading data from the storage devices by using the slots allocated to the user when reading data to be supplied to the user, and writing data into a specific storage device by using a specific slot for accessing the specific storage device from among the slots allocated to the user and a slot which is D-1 slots before the specific slot when writing data into the specific storage device in compliance with the user demand.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 7 is a diagram showing the relationship between the number of storage devices and the number of slots;

FIG. 8 is a diagram showing a user management table;

FIG. 9 is a diagram showing an access schedule table;

FIG. 11 is a diagram showing read/write timing of a storage device;

FIG. 14 is a diagram illustrating the dependence of individual slots according to a conventional access technique.

DESCRIPTION OF THE PREFERRED EMBODIMENT

An embodiment according to the present invention will be hereinafter described with reference to the drawings.

Figure 1:
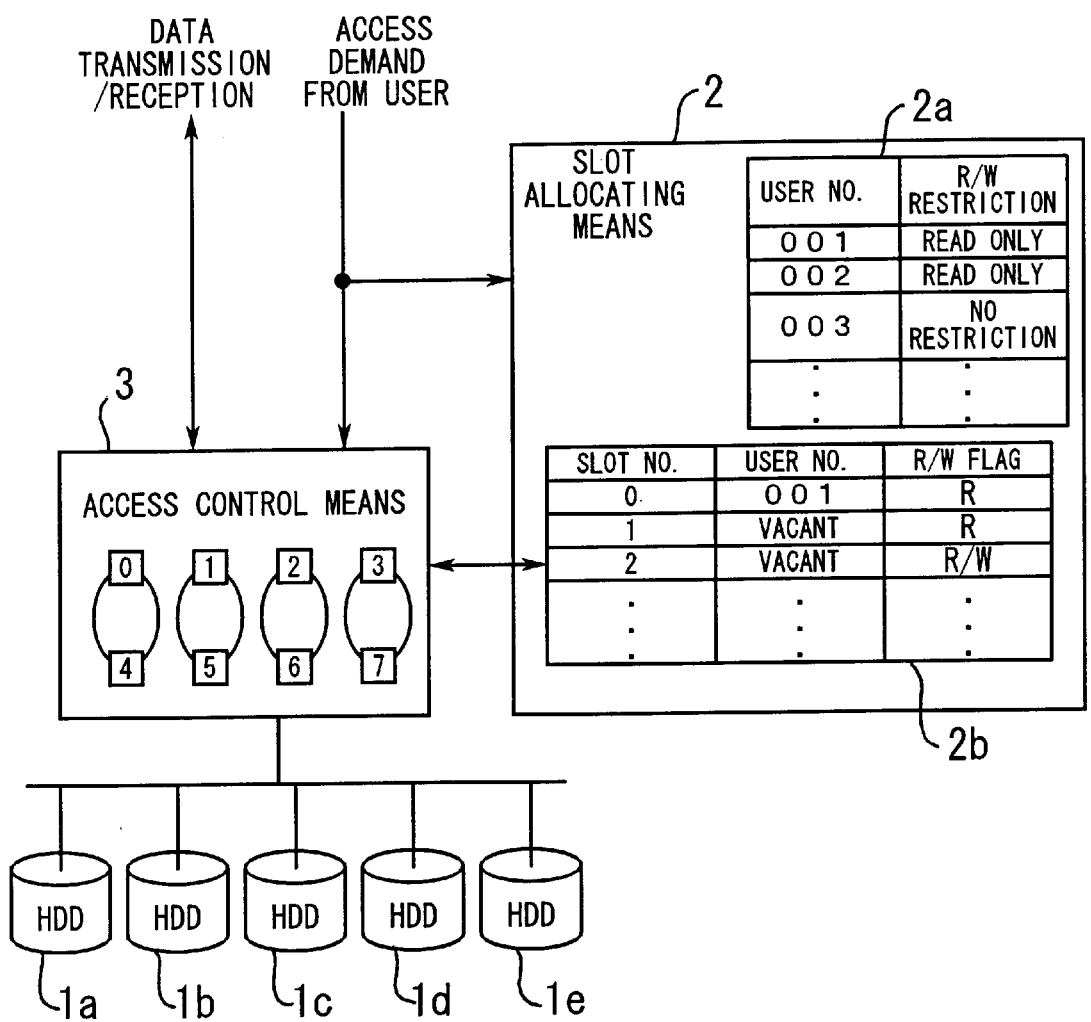
FIG. 1 is a diagram illustrating a theoretical configuration according to the present invention.

FIG. 1 is a diagram illustrating a theoretical configuration according to the present invention. In a data input/output control apparatus according to the present invention, multiple information to be supplied to users is stored distributedly (i.e., in a distributed manner) in a plurality of storage devices 1a to 1e. Slot allocating means 2 has a user management table 2a and an access schedule table 2b. The user management table 2a records therein user numbers for identifying users and restrictions placed on the users with the respective user numbers. In the access schedule table 2b are set slot numbers corresponding in number to slots, user numbers to which the respective slot numbers are allocated, and read/write flags indicating whether the respective slots permit read operations only or both read and write operations.

The slot allocating means 2 determines a number S of slots so that the value S may be prime with respect to the number D of the storage devices 1a to 1e. Slot allocating means 2 also groups time zones during which the multiple storage devices 1a to 1e read or write data to S slots in order of access, and assigns slot numbers to the respective slots. On receiving an access demand from a user, the slot allocating means 2 determines, based on the user management table 2a, the read/write restriction placed on the user. Then, comparing the result of the determination with the access schedule table 2b, the slot allocating means 2 allocates to the user who made the access demand a slot which is not yet allocated to other users from among those whose read/write flags agree with the read/write restriction on the user. After the slot is allocated, the contents of the access schedule table 2b are updated.

While referring to the access schedule table 2b, access control means 3 controls the access to the multiple storage devices. Specifically, in the case of reading data to be supplied to a user, the access control means 3 reads out data from the storage devices by means of slots allocated to the user. On the other hand, in the case of writing data into a specific storage device in compliance with a user's demand, the access control means 3 writes data into the specific storage device. The data is written by means of a specific slot which is capable of accessing the specific storage device from among the slots allocated to the user and the slot which is D–1 slots before the specific slot.

Consequently, a plurality of groups of mutually dependent slots are formed; in other words, multiple dependence rings are formed. The read/write flags of the slots belonging to the same dependence ring are set to the same value, whereby users with different purposes have no dependence on write operations by one another.

The above-described data input/output control apparatus according to the present invention can be effectively used in an information communication service system such as a VOD system. Therefore, in the following is described the case where the present invention is applied to such an information communication service system.

Figure 2:
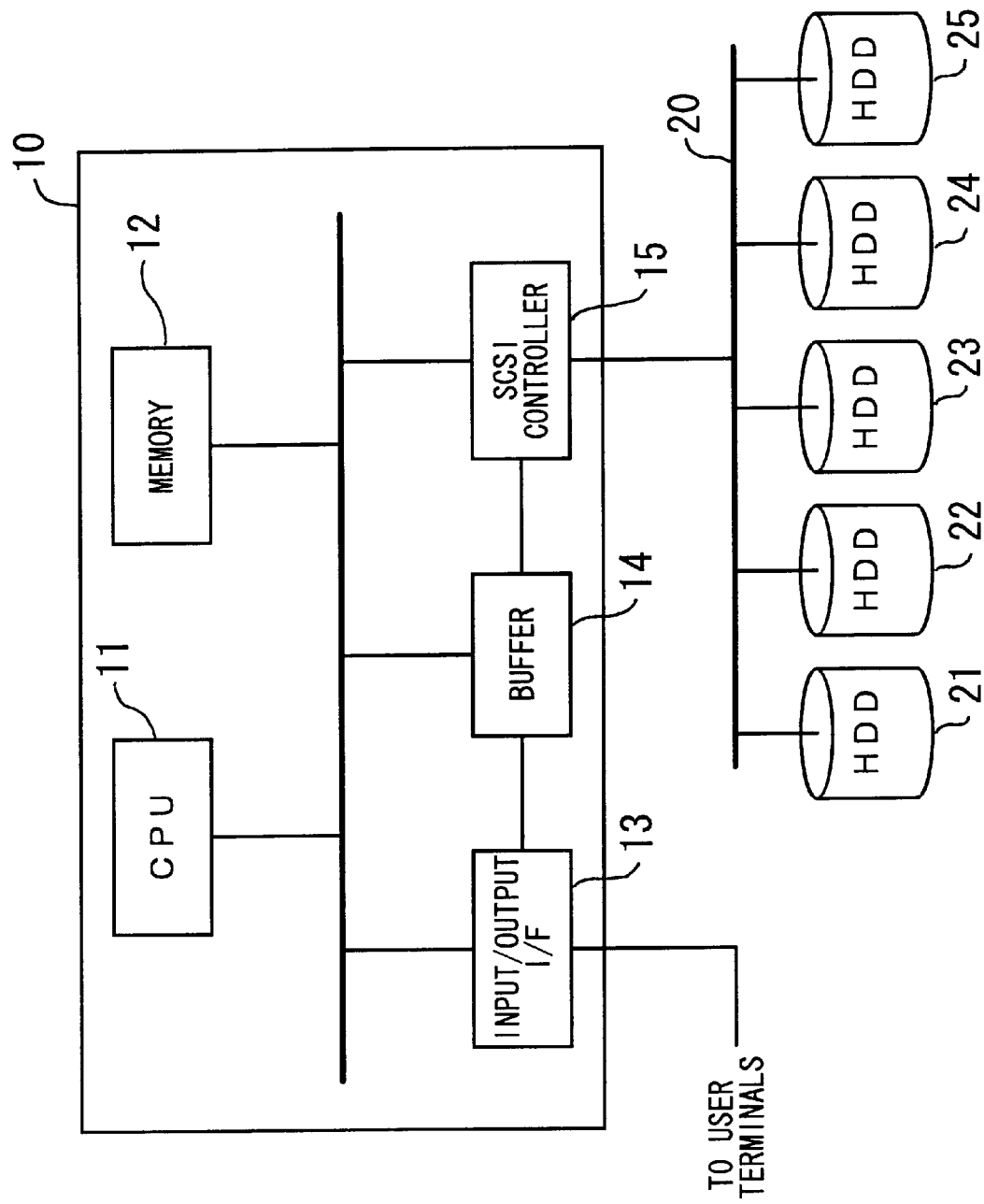
FIG. 2 is a diagram showing an information communication service system to which the present invention is applied.

FIG. 2 is a diagram showing an information communication service system to which the present invention is applied. In this system, a data input/output control apparatus 10 is designed to provide a maximum of eight users with information stored in five hard disk drives (HDDs) 21 to 25. Namely, the number of slots is "8".

In the data input/output control apparatus 10, a central processing unit (CPU) 11 globally controls the apparatus 10. A memory 12 temporarily stores programs executed by the CPU 11 and various data. An input/output interface (I/F) 13 is connected to a plurality of user terminals via an ATM (Asynchronous Transfer Mode) exchange, and allows data to be output to and input from the individual user terminals. A buffer 14 temporarily retains data received from the user terminals, data to be transmitted to the user terminals, etc. A SCSI (Small Computer System Interface) controller 15 outputs an access demand via a bus 20 to thereby exchange data with the HDDs 21 to 25. The order in which the SCSI controller 15 accesses the HDDs 21 to 25 is HDD 21→HDD 22→HDD 23→HDD 24→HDD 25→HDD 21 . . .

The HDDs 21 to 25 store multiple dynamic picture data in a distributed manner. All data to be stored is divided into units of data. Each unit data has a size such that it can be input or output within the time zone allocated to one slot. The divided units of data are stored in the HDDs in order of HDD 21→HDD 24→HDD 22→HDD 25→HDD 23→HDD 21 . . . This order is in agreement with the order in which the HDDs are assigned an identical slot number, that is, the order in which the user accesses the HDDs.

If, in this information communication service system, all processes demanded by users are read operations, the HDDs are accessed in the following manner.

Figure 3:
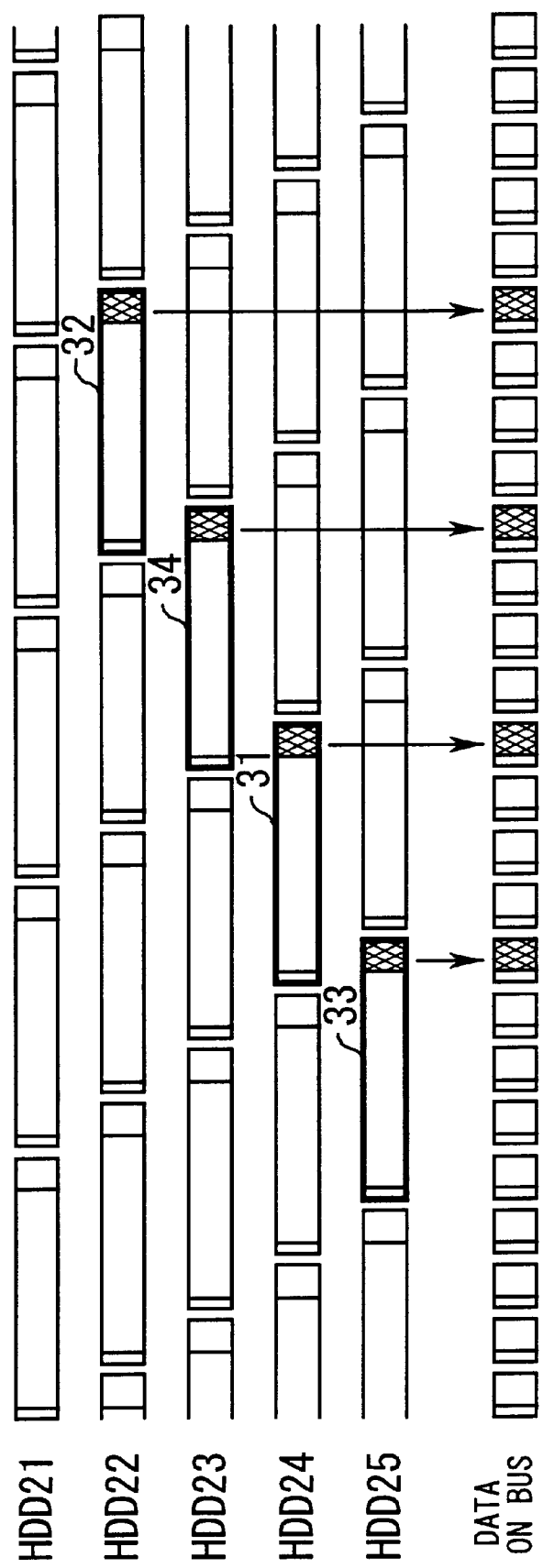
FIG. 3 is a diagram showing an access status wherein all slots are used for read operations.

FIG. 3 is a diagram showing an access status wherein all slots are used for read operations. FIG. 3 illustrates the access status in the form of an array of slots and shows, from the top downward, the slots of the HDDs 21 to 25 and data on the bus. The SCSI controller 15 outputs a read request to the HDDs in order of HDD 21→HDD 22→HDD 23→HDD 24→HDD 25→HDD 21 . . . Data is transferred from the HDDs in the order in which the HDDs received the read requests.

In the case where a write operation is to be performed in two slots 31 and 32, the operations in slots 33 and 34 which are four slots (the value obtained by subtracting 1 from the number of the HDDs) before the respective slots 31 and 32 are canceled.

Figure 4:
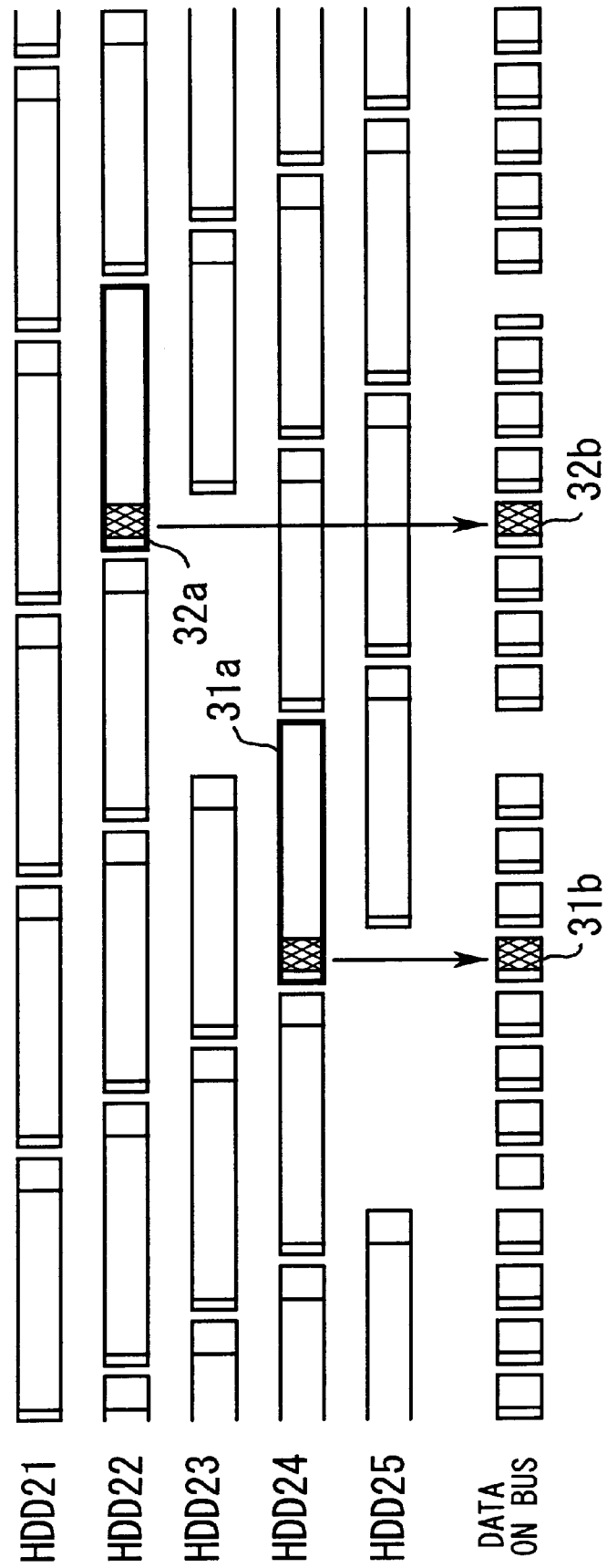
FIG. 4 is a diagram showing an access status according to the present invention wherein both write and read operations are performed.

FIG. 4 is a diagram showing an access status according to the present invention wherein both write and read operations are performed. In the case where write a operation is performed in slots 31a and 32a, the slots 31a and 32a use time zones 31b and 32b, respectively, which correspond to the data transfer time zones of the slots 33 and 34 in FIG. 3, to transfer data to be written in the slots 31a and 32a.

Since write data is transferred in accordance with such timing, the individual slots have the dependence relationship described below.

Figure 5:
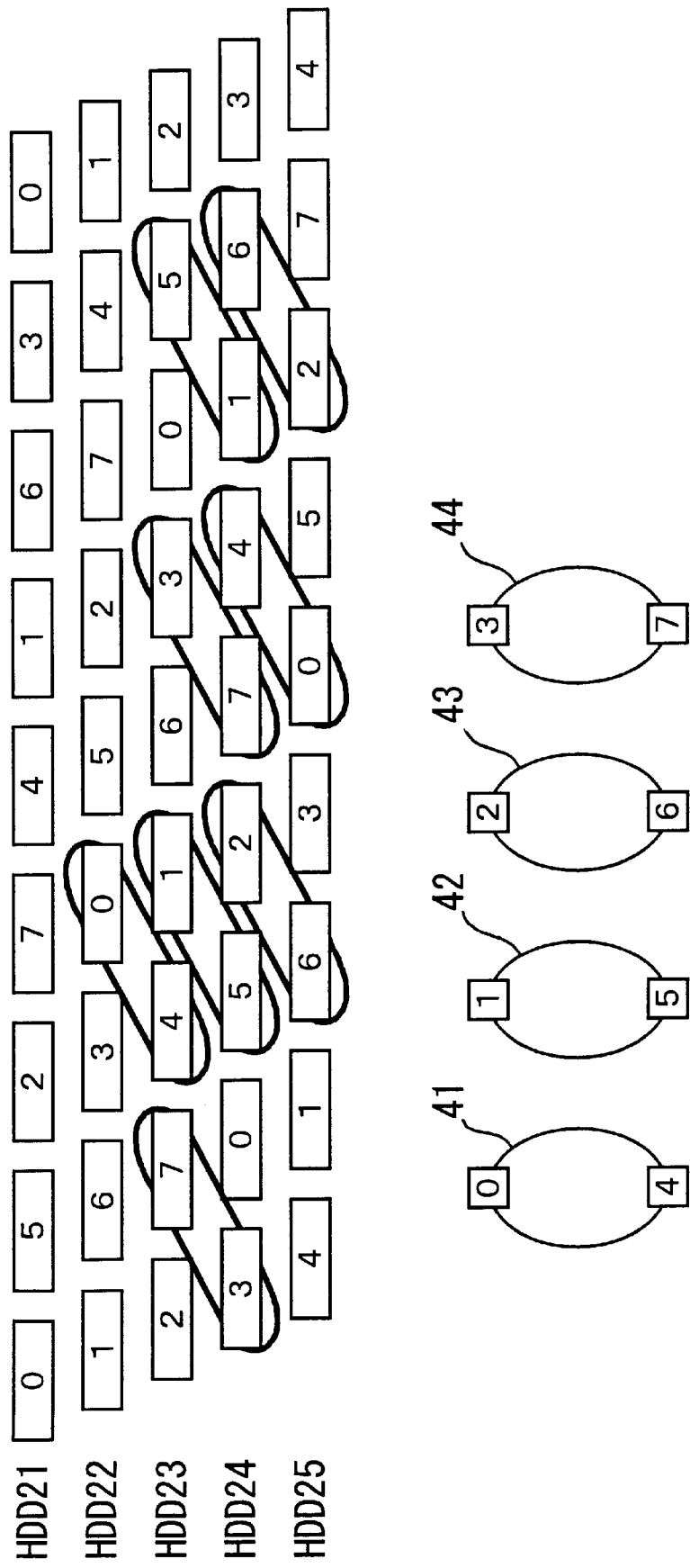
FIG. 5 is a diagram illustrating the dependence of individual slots according to the present invention.

FIG. 5 is a diagram showing the dependence of the individual slots according to the present invention. In FIG. 5, the numerals inside the rectangular slot time zones represent the slot numbers of the respective slots, and mutually dependent slots are indicated by a thick line.

As seen from FIG. 5, the slot "0" affects the slot "4", the slot "1" affects the slot "5", the slot "2" affects the slot "6", the slot "3" affects the slot "7", the slot "4" affects the slot "0", the slot "5" affects the slot "1", the slot "6" affects the slot "2", and the slot "7" affects the slot "3". This dependence relationship can be expressed by dependence rings; the slots "0" and "4" form a dependence ring 41, the slots "1" and "5" form a dependence ring 42, the slots "2" and "6" form a dependence ring 43, and the slots "3" and "7" form a dependence ring 44. Thus, four dependence rings 41 to 44 are formed.

Users using this system are allocated slots according to their purposes, etc. Specifically, users with similar purposes, etc., are allocated slots belonging to the same dependence ring. In order to achieve such allocation of slots to users, the number of slots in each dependence ring must be computed based on the number of storage devices and the number of slots. Since the number of slots is restricted to be prime to the number of storage devices, the number of storage devices, the number of slots, and the number of slots in each dependence ring are calculated following the procedure described below.

Figure 6:
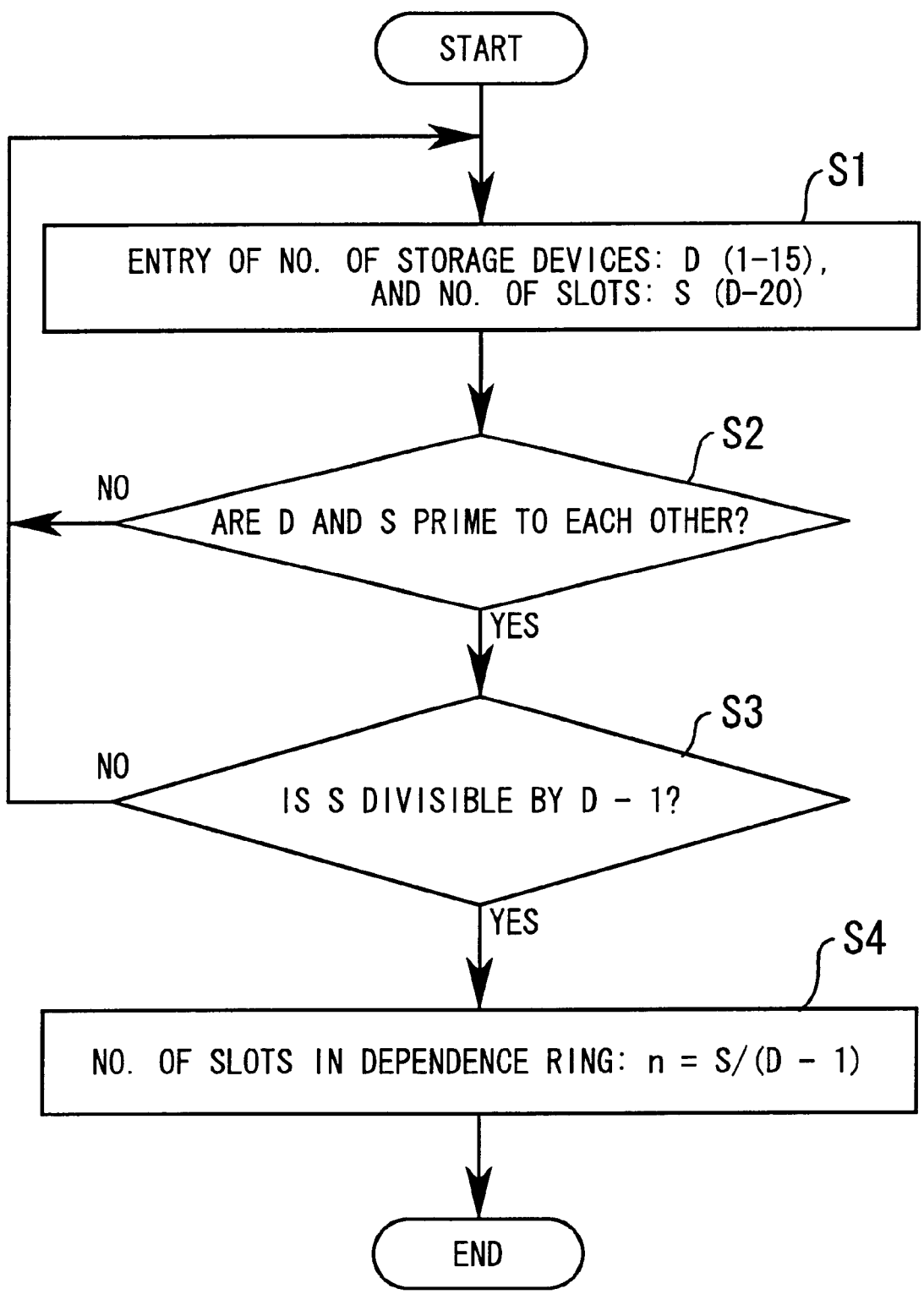
FIG. 6 is a flowchart showing a procedure for calculating a number of storage devices and a number of slots.

FIG. 6 is a flowchart showing the procedure for calculating the number of storage devices and the number of slots.

[S1] Using an input device such as a keyboard, the operator enters the number D of storage devices and the number S of slots. It is here assumed that the number of storage devices is limited to the range of 1 to 15 and that the number of slots is limited to the range of D to 20.

[S2] The CPU 11 determines whether or not D and S are prime to each other. If the two are prime to each other, the flow proceeds to Step S3, and if not, the flow returns to Step S1 in which D and S are set to different values for recalculation.

[S3] The CPU 11 determines whether or not S is divisible by D−1. If the former is divisible by the latter, the flow proceeds to Step S4, and if not, the flow returns to Step S1 in which D and S are set to different values for recalculation.

[S4] The CPU 11 obtains the number n of slots in each dependence ring according to the following equation (1):

$$n = S/(D-1) \qquad (1)$$

Consequently, the number D of storage devices, the number S of slots, and the number n of slots in each dependence ring are determined. Here, D−1 represents the number of dependence rings.

FIG. 7 is a diagram showing the relationship between the number of storage devices and the number of slots. In the case where the number of storage devices is "2", the number of slots may be any one of "3", "5", "7", "9", "11", "13", "15", "17" and "19". The number of dependence rings is in this case "1", regardless of the number of slots. The number of slots in each dependence ring is equal to the number of slots corresponding thereto.

Where the number of storage devices is "3", the number of slots may be "4", "8", "10", "14" or "16". The number of dependence rings is in this case "2", regardless of the number of slots. The number of slots in each dependence ring is "2", "4", "5", "7" or "8".

In the case where the number of storage devices is "4", the number of slots may be either "9" or "15". The number of dependence rings is in this case "3", regardless of the number of slots. The number of slots in each dependence ring is "3" or "5".

Where the number of storage devices is "5", the number of slots may be "8", "12" or "16". The number of dependence rings is in this case "4", regardless of the number of slots. The number of slots in each dependence ring is "2", "3" or "4".

In the case where the number of storage devices is "7", the number of slots may be either "12" or "18". The number of dependence rings is in this case "6", regardless of the number of slots. The number of slots in each dependence ring is "2" or "3".

Where the number of storage devices is "9", the number of slots should be "16". The number of dependence rings is in this case "8". The number of slots in each dependence ring is "2".

The number of slots indicates the number of users who can receive the service, that is, the maximum number of accesses, and the number of storage devices depends on the scale of the system. Accordingly, when constructing a system using the present invention, the number of persons who can receive the service is set to an optimum value taking the scale of the system into consideration.

After the number of dependence rings and the number of slots in each dependence ring are determined, it is then determined to what users the slots in the individual dependence rings are to be allocated. In this example, the dependence rings are classified according to whether they are open to users who are permitted to write data (non-restriction users) or to users who are permitted to read data only (read-only users). For example, users who need data without delay are categorized as "read-only users" and those who need to handle information interactively are categorized as "non-restriction users." To this end, it is necessary to manage users as to which user requires which type of process. Therefore, after the operator enters the contents of restrictions placed on the individual users, the CPU 11 creates a user management table and stores the same in the memory 12.

FIG. 8 is a diagram showing the user management table. The users who can use this system are previously assigned their respective user numbers. In the user management table 51 are recorded the contents of read/write restrictions in association with the individual user numbers. "Read only" is set for those users who read data only, and "no restriction" is set for those users who also write data. As shown in FIG. 8, the user with the user number "001" is a "read-only" user, the user with the user number "002" also is a "read-only" user, and the user with the user number "003" is a "non-restriction" user.

Subsequently, it is decided which user should be allocated to which one of the dependence rings formed as described above. After the operator enters the result of the decision, the CPU 11 creates an access schedule table in accordance with the entered contents of the decision and stores the created table in the memory 12.

FIG. 9 is a diagram showing the access schedule table. The access schedule table 52 records therein user numbers and read/write flags in association with the respective slot numbers. The number of slot numbers prepared is equal to the number of slots. In the illustrated example in FIG. 9, the number of slots is 8, and the numerals 0 to 7 are set in the respective slot number fields. In the user number fields are recorded user numbers of users to whom the corresponding slot numbers have been allocated, and the read/write flags indicate the operations available in the corresponding slots. If read operations alone are available, "R" is set, and if both read and write operations are available, "R/W" is set. The read/write flags associated with the slots belonging to the same dependence ring have the same contents.

In this example, the slot with the slot number "0" is allocated to the user with the user number "001" and the flag "R" is set for this slot. The slot with the slot number "1" is "vacant" and the flag "R" is set therefor. The slot with the slot number "2" also is "vacant" and the flag "R/W" is set for the slot. The slot with the slot number "3" is "vacant" and the flag "R" is set therefor. The slot with the slot number "4" is allocated to the user with the user number "002" and the flag "R" is set for this slot. The slot with the slot number "5" is "vacant" and the flag "R" is set therefor. The slot with the slot number "6" is allocated to the user with the user number "003" and the flag "R/W" is set for this slot. The slot with the slot number "7" is "vacant" and the flag "R" is set for the slot.

Thus, those users who are restricted to "read only" are assigned slots of which the read/write flags are "R", while those users on whom "no restriction" is placed as to read/write operations are assigned slots of which the read/write flags are "R/W". Based on the user management table and the access schedule table, the CPU 11 decides the slots to be allocated to users who are demanding the service. A procedure for this decision process will be explained below.

Figure 10:
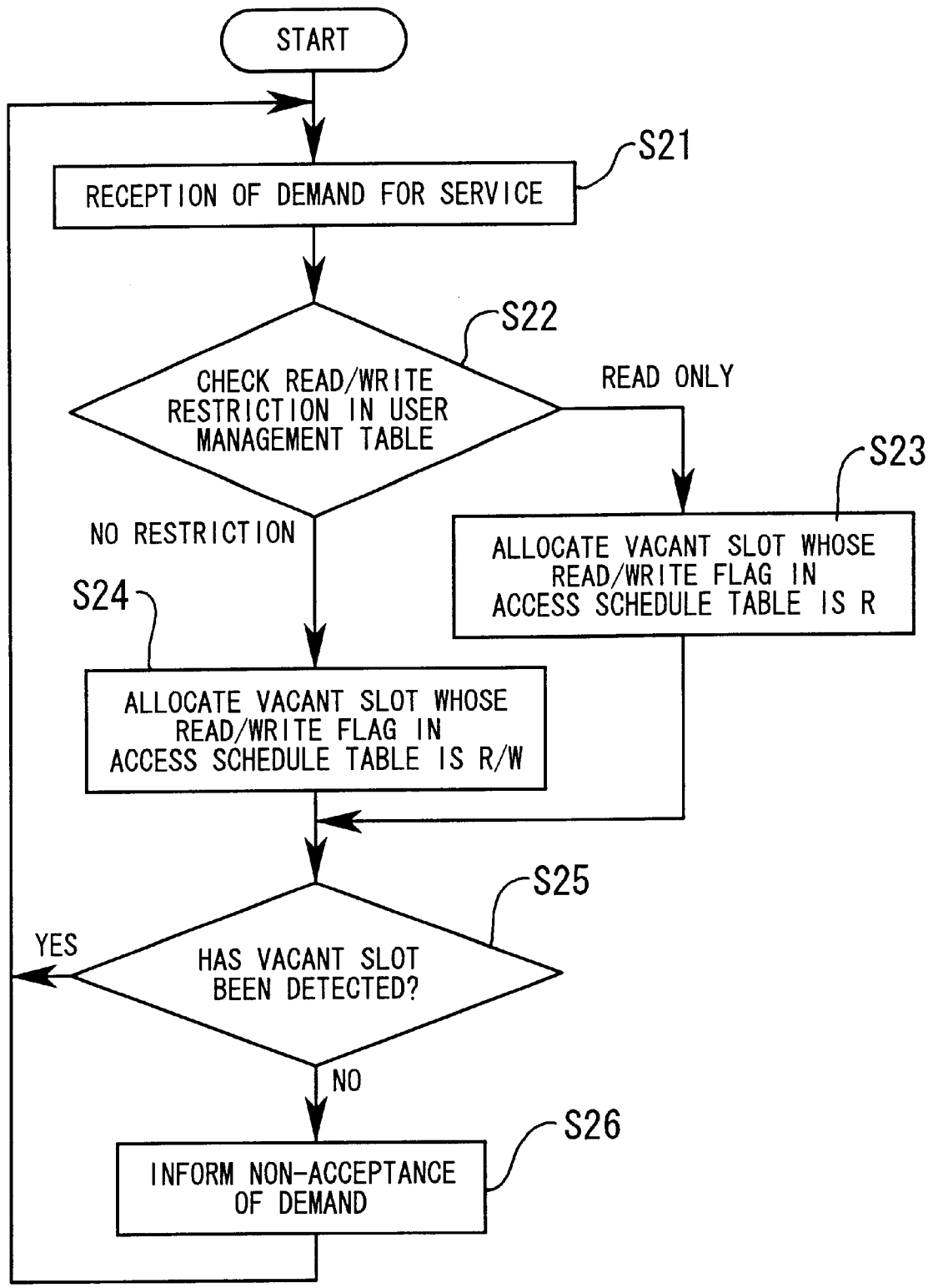
FIG. 10 is a flowchart showing a slot allocation decision process.
Figure 12:
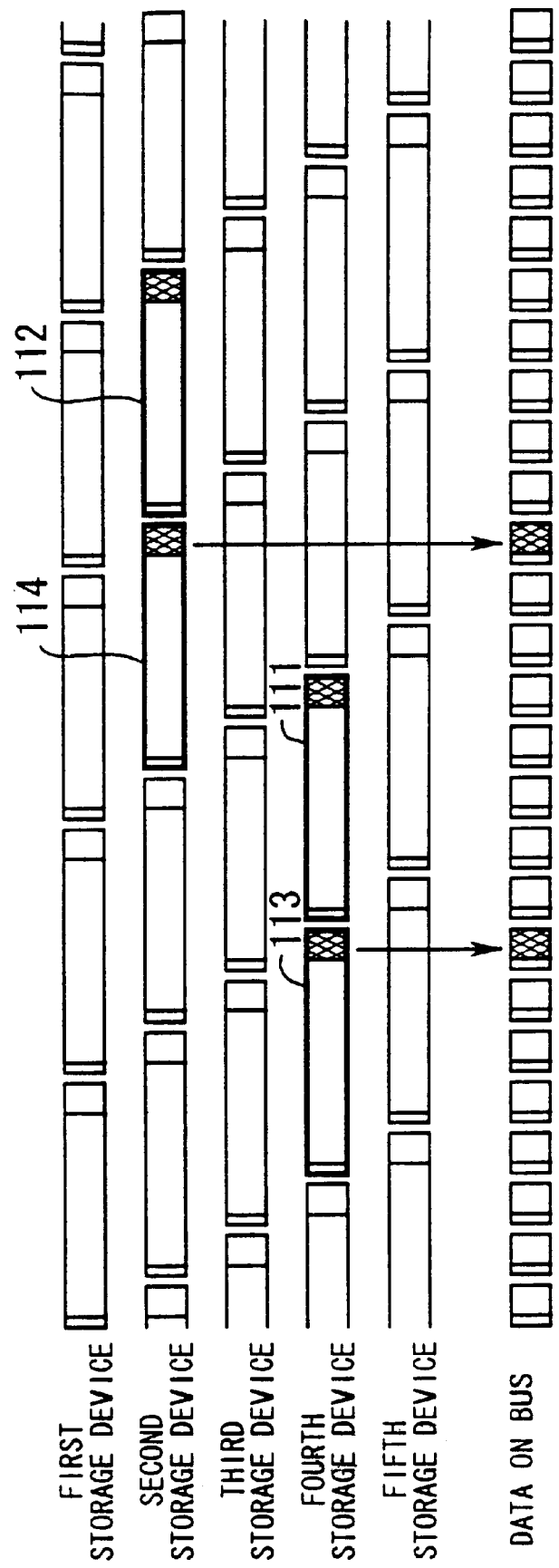
FIG. 12 is a diagram showing an access status wherein all slots are used for read operations.
Figure 13:
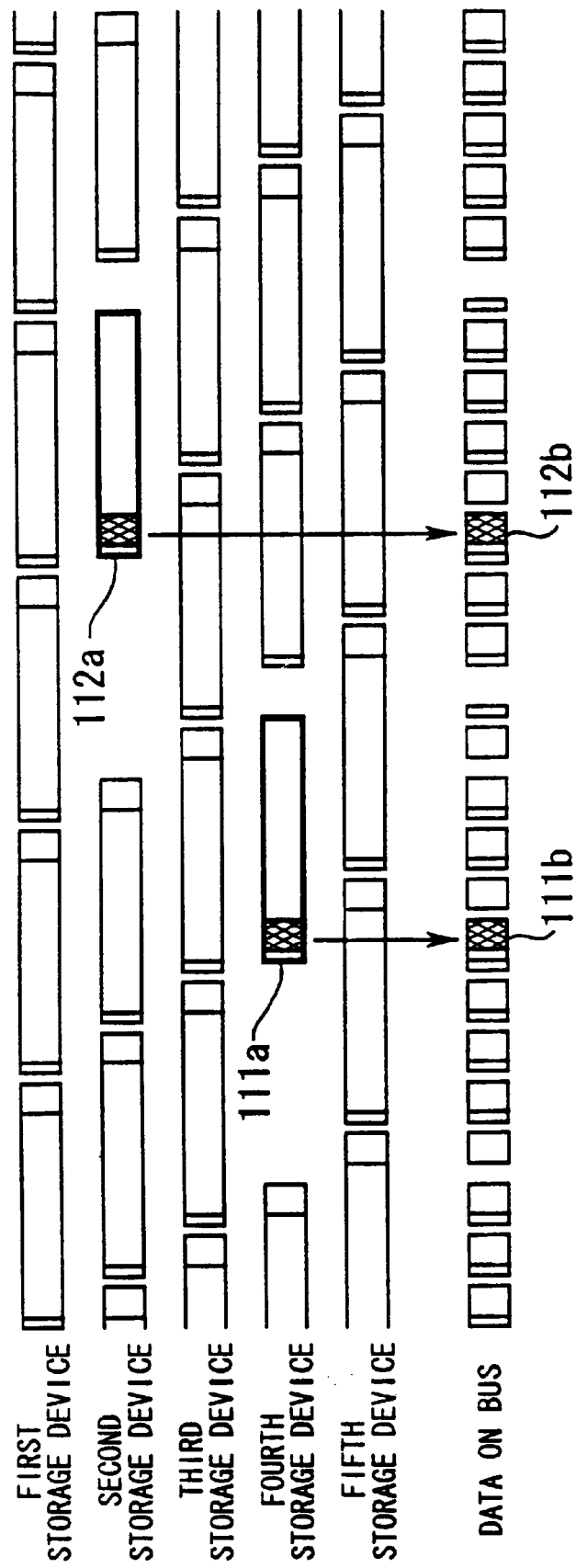
FIG. 13 is a diagram showing an access status wherein both write and read operations are performed.

FIG. 10 is a flowchart showing the procedure for the slot allocation decision process. This process is executed by the CPU 11 in the data input/output control apparatus.

[S21] A user's demand for the service is received.

[S22] It is determined whether "read only" or "no restriction" has been set for the user in question, by referring to the user management table. If "read only" has been set, the flow proceeds to Step S23, and if "no restriction" has been set, the flow proceeds to Step S24.

[S23] Referring to the access schedule table, a vacant slot, of which the read/write flag is "R" is allocated to the user who made the demand for the service.

[S24] Referring to the access schedule table, a vacant slot of which the read/write flag is "R/W" is allocated to the user who made the demand for the service.

[S25] It is determined whether a vacant slot has been detected in Step S23 or Step S24. If a vacant slot has been detected, the flow returns to Step S21 because the vacant slot is allocated to the user who made the demand. On the other hand, if no vacant slot has been detected, the flow proceeds to Step S26.

[S26] A notification that the demand for the service was not accepted is sent to the user's terminal, and the flow returns to Step S21.

In this manner, a plurality of dependence rings are formed and slots belonging to the individual dependence rings are allocated to appropriate users, thereby making it possible to provide improved user-dependent services. Also, where the dependence rings are classified as to read/write operations, each slot of a dependence ring for read operations is never affected by write operations in the other slots of the ring. Namely, in the case where the slots of dependence rings for read operations are used, high-quality services free from data delay can be provided.

Further, where an access demand is made by an especially important user, a whole dependence ring can be allocated to the user for exclusive use. By permitting an important user to occupy a whole dependence ring, his/her process is never influenced even if other users write a vast amount of data.

As described above, in the data input/output control apparatus according to the present invention, the access control device. The data is written into a storage device by using a slot for accessing the storage device into which data is to be written, from among the slots allocated to a user, and a slot which is D-1 slots before the slot, so that a plurality of dependence rings indicating the mutual dependence of the slots are formed. Consequently, there is no dependence among slots belonging to different dependence rings, thus making it possible to provide improved services meeting the users' needs.

According to the storage device accessing method of the present invention, the number S of slots is determined such that the value S is prime to the number D of multiple storage devices. Data is written into a storage device by using a slot for accessing the storage device and a slot which is D-1 slots before the slot, whereby a plurality of dependence rings are formed, making it possible to provide individual users with respective services.

The foregoing is considered as illustrative only of the principles of the present invention. Further, since numerous modifications and changes will readily occur to those skilled in the art, it is not desired to limit the invention to the exact construction and applications shown and described. Accordingly, all suitable modifications and equivalents may be regarded as falling within the scope of the invention in the appended claims and their equivalents.

What is claimed is:

1. A data input/output control apparatus which includes a plurality of storage devices storing multiple information in a distributed manner and accessed in a predetermined access order, said apparatus comprising:

slot allocating means for determining a number S of slots such that the number S is prime with respect to a number D of said plurality of storage devices, grouping time zones in which data is read from or written into said plurality of storage devices to S slots in the predetermined access order, and allocating slots to a user device that outputs a demand for access to said plurality of storage devices; and access control means for reading data from the storage devices by using the slots allocated to the user device when reading data to be supplied to the user device, and writing data into a specific storage device by using a specific slot for accessing the specific storage device from among the slots allocated to the user device and a slot which is D-1 slots before the specific slot when writing data into the specific storage device in response to the access demand.

2. The data input/output control apparatus according to claim 1, wherein said slot allocating means associates slots which are separated by D-1 slots from one another in the predetermined access order, and allocates a plurality of associated slots to user devices on whom an identical restriction is placed.

3. The data input/output control apparatus according to claim 1, wherein said slot allocating means performs management as to whether a user device that outputs an access demand is permitted to write data and whether the individual grouped slots permit write operations, allocates a slot which permits a write operation to a user device that is permitted to write data, and allocates a slot which does not permit a write operation to a user device that is not permitted to write data.

4. A method of accessing a plurality of storage devices storing multiple information in a distributed manner and accessed in a predetermined access order, the method comprising:

determining a number S of slots such that the number S is prime with respect to a number D of said plurality of storage devices, and grouping time zones in which data is read from or written into said plurality of storage devices to S slots in the predetermined access order;

allocating slots to a user device that outputs a demand for access to said plurality of storage devices; and reading data from the storage devices by using the slots allocated to the user device when reading data to be supplied to the user device, and writing data into a specific storage device by using a specific slot for accessing the specific storage device from among the slots allocated to the user device and a slot which is D-1 slots before the specific slot when writing data into the specific storage device in response to the access demand.

5. A data access control device, comprising:

an allocation module allocating a selected slot from a plurality of slots for access to a plurality of storage devices, each slot comprising a grouping of access intervals selected from a successive sequence of time intervals for access to respective ones of storage devices, a number S representing a count of the slots being relatively prime to a number D representing a count of the storage devices; and an access controller performing during time intervals of the selected slot at least one of reading data from one or more of the storage devices and writing data to a specified storage device, responsive to an access demand corresponding to the selected slot.

6. A data access control device according to claim 5, wherein the selected slot belongs to a dependence ring of slots selected from the plurality of slots and in which write accesses to the storage devices are permitted, the selected slot and a slot (D−1) slots in advance thereof providing write access to the specified storage device.

7. A data access control device according to claim 5, wherein said allocation module further associates the plurality of slots into one or more dependence rings, each of the dependence rings comprising slots spaced (D−1) slots apart according to the successive sequence of time intervals.

8. A computer-readable medium encoded with a program for data access control, said program comprising procedures for:

determining a number S relatively prime to a number D representing a count of a plurality of storage devices providing distributed data storage;

grouping time intervals for access to the storage devices into a plurality of slots having a count equal to S, each of the slots comprising every S-th time interval from a starting time interval in a successive order of the time intervals;

allocating a slot selected from the plurality of slots responsive to an access demand; and performing at least one of reading data from the storage devices and writing data to a specified storage device associated with the selected slot.

* * * * *